US010746929B2

(12) United States Patent
Bohbot (10) Patent No.: US 10,746,929 B2
(45) Date of Patent: Aug. 18, 2020

(54) FIBER OPTIC CABLE EXTENSION SLEEVE FOR RECEIVING A SPLICE PROTECTOR OF FUSED FIBER STRANDS

(71) Applicant: 3975266 CANADA INC, Hampstead (CA)

(72) Inventor: Michel Bohbot, Hampstead (CA)

(73) Assignee: 3975266 CANADA INC., Ottawa, Ontario (CA)

( * ) Notice: Subject to any disclaimer, the term of this patent is extended or adjusted under 35 U.S.C. 154(b) by 0 days.

(21) Appl. No.: 16/478,620

(22) PCT Filed: Jan. 19, 2018

(86) PCT No.: PCT/CA2018/050062
§ 371 (c)(1),
(2) Date: Jul. 17, 2019

(87) PCT Pub. No.: WO2018/132918
PCT Pub. Date: Jul. 26, 2018

(65) Prior Publication Data
US 2019/0369332 A1  Dec. 5, 2019

Related U.S. Application Data

(60) Provisional application No. 62/448,420, filed on Jan. 20, 2017.

(51) Int. Cl.
*G02B 6/255*  (2006.01)
*G02B 6/44*  (2006.01)
(52) U.S. Cl.
CPC ......... *G02B 6/2558* (2013.01); *G02B 6/4454* (2013.01)

(58) Field of Classification Search
CPC ............................ G02B 6/2558; G02B 6/4454
USPC .......................................................... 385/135
See application file for complete search history.

(56) References Cited

U.S. PATENT DOCUMENTS

| | | | | |
|---|---|---|---|---|
| 5,315,682 A * | 5/1994 | Daguet | ............... | G02B 6/2558 385/107 |
| 6,382,845 B1 * | 5/2002 | Gould | ................. | G02B 6/3801 385/134 |
| 7,379,649 B2 * | 5/2008 | Gould | ................. | G02B 6/3801 385/134 |
| 7,494,289 B1 * | 2/2009 | Chen | .................... | G02B 6/2558 385/95 |
| 7,769,267 B2 * | 8/2010 | Gould | ................. | G02B 6/4467 385/134 |
| 2005/0191014 A1 * | 9/2005 | Renfro, Jr. | .......... | G02B 6/2551 385/99 |

(Continued)

FOREIGN PATENT DOCUMENTS

| | | | | |
|---|---|---|---|---|
| WO | WO-9609670 A1 * | 3/1996 | .......... | H02G 15/007 |
| WO | WO-2008034727 A1 * | 3/2008 | .......... | G02B 6/2558 |
| WO | WO-2018132918 A1 * | 7/2018 | .......... | G02B 6/4454 |

*Primary Examiner* — Sung H Pak
(74) *Attorney, Agent, or Firm* — Philip A. Swain (57) ABSTRACT

The present disclosure relates to techniques for facilitating termination of fiber optic cable ends, and consists of a fiber optic cable extension, based on a re-openable jacket sleeve, which is designed to support a multitude of spliced fibers. The sleeve, typically flexible, involves splicing of a multiple fiber optic cable with pigtails, where fiber splices are integrated onto the re-openable jacket sleeve.

20 Claims, 6 Drawing Sheets

(56) References Cited

U.S. PATENT DOCUMENTS

| | | | |
|---|---|---|---|
| 2010/0086265 A1* | 4/2010 | Kojima | G02B 6/255 385/98 |
| 2010/0247044 A1* | 9/2010 | Noddings | G02B 6/2558 385/99 |
| 2012/0080419 A1* | 4/2012 | Bush | G02B 6/2558 219/385 |
| 2012/0293390 A1* | 11/2012 | Shoemaker | H01Q 9/27 343/853 |
| 2019/0293891 A1* | 9/2019 | Hurley | G02B 6/4403 |

* cited by examiner

FIBER OPTIC CABLE EXTENSION SLEEVE FOR RECEIVING A SPLICE PROTECTOR OF FUSED FIBER STRANDS

CROSS-REFERENCE TO RELATED APPLICATIONS

This application claims priority from U.S. Provisional Application No. 62/448,420 filed on Jan. 20, 2017.

TECHNICAL FIELD

The description relates to the field of fiber optics. More particularly, the description relates to a fiber optic cable extension sleeve for receiving one or a plurality of splice protector(s) of fused fiber strands.

BACKGROUND

Fiber optic transmission systems have become common in use into networking cabling systems, mainly as part of the backbone high data speed rate requirements. It is often recommended to install a minimum of 12 fiber optic cables per Telecommunications Room within a building, and a minimum of 24 fiber optic cables for installations between buildings in campus environments. Such fiber optic cables need to be terminated with connectors on panel (rack mounted or wall mounted) at each end of the cable.

One way to terminate a multi fiber optic cable is to fuse each fiber (12 to 24 fiber strands per cable) with pigtails, using fusion splicing equipment. Pigtails are factory terminated connectors on approximately 1-meter (3-feet) long fiber strand. Before performing the fusion, the cable needs to be unjacketed to expose a minimum of 60 cm (2 feet) of fiber strands. The purposed of exposing 60 cm to 1 m long fiber strand from the end of the cable is to facilitate the technician handling when performing the fusion splice, as well as accessing additional cable (slack) as needed for performing reworks and or connector or pigtail replacements.

Figure 1A:
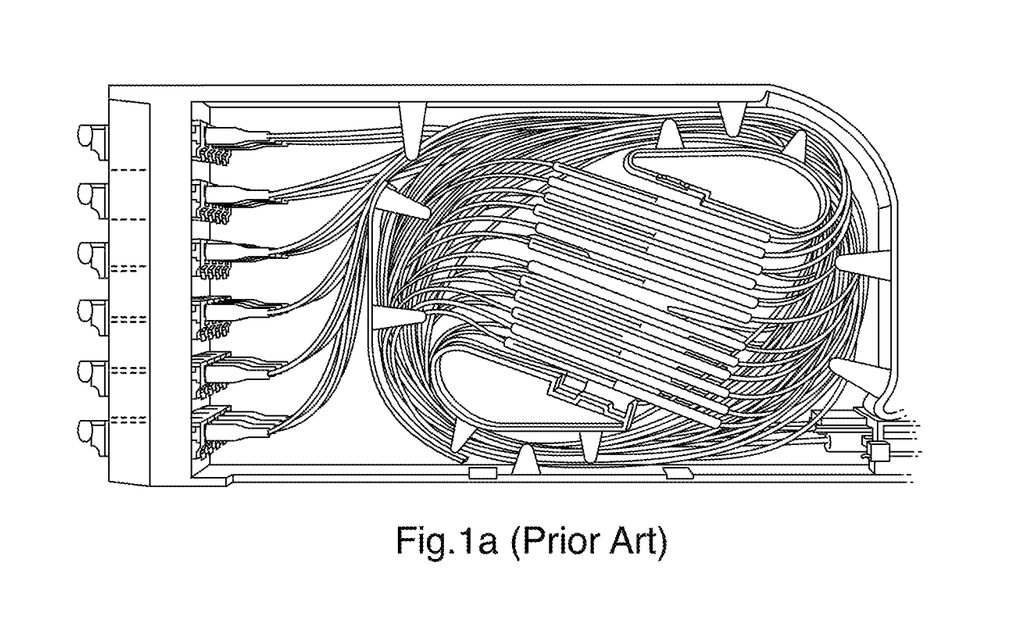
FIGS. 1a and 1b are a top plan view and a top perspective view of prior art fiber optic splice closures.
Figure 1B:
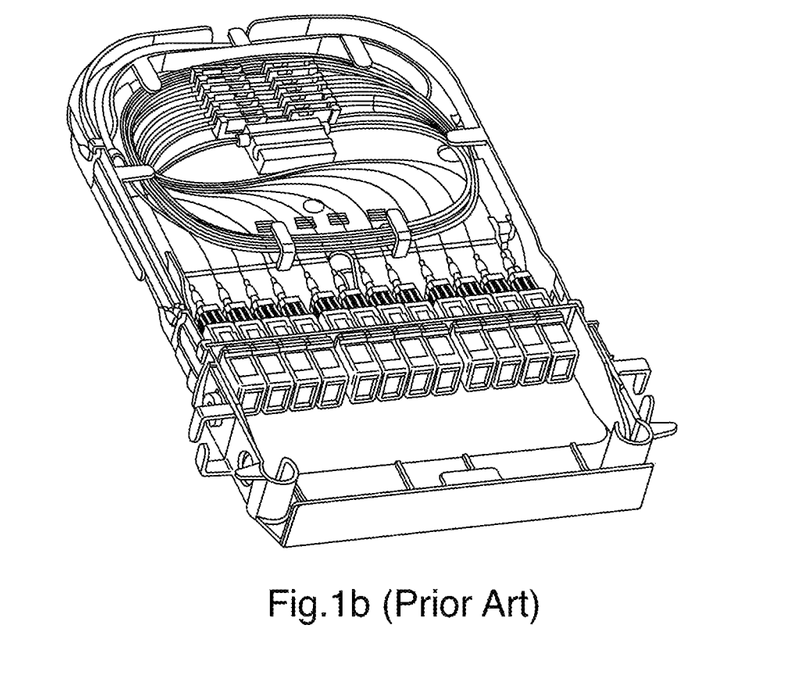

Each of these fiber optic strands and pigtail strands is stripped, cleaned and cleaved before insertion into the fusion splicing equipment. Since the obtained splice is very fragile, a special heat shrink tube, the fiber splice protector, is placed in between the two fused fiber strands. The use of a fiber optic splice closure, as shown in FIGS. 1a and 1b, is to manage and protect the splice protectors as well as the exposed fiber strands (from the cable and pigtails) in a closed enclosure, that will generally be found in the fiber optic panel.

However, there is a need for an improved fiber optic cable extension sleeve.

SUMMARY

It is an object of the present disclosure to provide a fiber optic cable extension sleeve that overcomes or mitigates one or more disadvantages of known fiber optic splice closures or at least provides a useful alternative.

According to an embodiment, there is provided a fiber optic cable extension sleeve for receiving a splice protector of fused fiber strands, said fiber optic cable extension sleeve comprising: a substantially flexible main body defining an inner surface and opposite longitudinal edges for releasably engaging one another, thereby providing the inner surface to form a passage for receiving the fused fiber strands; and a splice protector receiving member extending from the inner surface of the main body between the opposite longitudinal edges for releasably securing the splice protector therein.

According to an embodiment, there is provided the fiber optic cable extension sleeve above, wherein the splice protector receiving member is extending from the inner surface longitudinally along the length of the flexible main body.

According to an embodiment, there is provided the fiber optic cable extension sleeve above, wherein the splice protector receiving member comprises a plurality of distant longitudinal receiving channels for releasably securing a plurality of splice protectors therein.

According to an embodiment, there is provided the fiber optic cable extension sleeve above, wherein each one of the plurality of longitudinal receiving channels comprises a first lip and a second lip distant from the first lip, the first lip and the second lip outwardly extending from the inner surface.

According to an embodiment, there is provided the fiber optic cable extension sleeve above, wherein the first lip comprises a first lip end and the second lip comprises a second lip end distant from the first lip end, thereby providing a longitudinal passage for securing the splice protector within the longitudinal receiving channel.

According to an embodiment, there is provided the fiber optic cable extension sleeve above, wherein one of the opposite longitudinal edges comprises an attachment member and the other one of the opposite longitudinal edges comprises a corresponding attachment member for releasably engaging with the attachment member.

According to an embodiment, there is provided the fiber optic cable extension sleeve above, wherein the attachment member comprises a male attachment element and the corresponding attachment member comprises a female attachment element for releasably receiving the male attachment element.

According to an embodiment, there is provided the fiber optic cable extension sleeve above, wherein the substantially flexible main body, the splice protector receiving member and the attachment members are integrally formed.

According to an embodiment, there is provided the fiber optic cable extension sleeve above, further comprising a closing member for interfacing with the substantially flexible main body, thereby providing a secured closure of the substantially flexible main body when the longitudinal edges releasably engage one another.

According to an embodiment, there is provided the fiber optic cable extension sleeve above, wherein the attachment members, when releasably engaged together, define an attachment external surface, and further wherein the closing member comprises: a closing member main body defining a closing member inner surface for interfacing with the attachment external surface of the substantially flexible main body.

According to an embodiment, there is provided the fiber optic cable extension sleeve above, wherein the closing member inner surface defines a first passage for securely receiving the attachment members when releasably engaged together, and a second passage for securely receiving part of the substantially flexible main body.

According to an embodiment, there is provided the fiber optic cable extension sleeve above, wherein the inner surface of the substantially flexible main body comprises a longitudinal channeled recess along the length of the flexible main body between the opposite longitudinal edges.

According to an embodiment, there is provided the fiber optic cable extension sleeve above, wherein the inner surface of the substantially flexible main body comprises a plurality of spaced apart longitudinal channeled recesses along the length of the flexible main body between the opposite longitudinal edges.

According to an embodiment, there is provided the fiber optic cable extension sleeve above, wherein the splice protector receiving member is extending from the inner surface and longitudinally and continuously along the length of the flexible main body.

According to an embodiment, there is provided the fiber optic cable extension sleeve above, wherein each one of the plurality of distant longitudinal receiving channels defines a channel section corresponding to a splice protector section.

According to an embodiment, there is provided the fiber optic cable extension sleeve above, wherein the channel section defines a circular section or an oval section.

According to an embodiment, there is provided a fiber optic cable extension sleeve for receiving a plurality of splice protectors of fused fiber strands, said fiber optic cable extension sleeve comprising: a substantially flexible main body defining an inner surface and opposite longitudinal edges for releasably engaging one another, thereby providing the inner surface to form a passage for receiving the fused fiber strands; a plurality of distant longitudinal receiving channels extending from the inner surface longitudinally along the length of the flexible main body for releasably securing the plurality of splice protectors therein; and a closing member for interfacing with the substantially flexible main body, thereby providing a secured closure of the substantially flexible main body when the longitudinal edges releasably engage one another.

According to an embodiment, there is provided the fiber optic cable extension sleeve above, wherein each one of the plurality of longitudinal receiving channels comprises a first lip and a second lip distant from the first lip, the first lip and the second lip outwardly extending from the inner surface.

According to an embodiment, there is provided the fiber optic cable extension sleeve above, wherein the first lip comprises a first lip end and the second lip comprises a second lip end distant from the first lip end, thereby providing a longitudinal passage for securing the splice protector within the longitudinal receiving channel.

According to an embodiment, there is provided the fiber optic cable extension sleeve above, wherein the attachment members, when releasably engaged together, define an attachment external surface, and further wherein the closing member comprises: a closing member main body defining a closing member inner surface for interfacing with the attachment external surface of the substantially flexible main body.

BRIEF DESCRIPTION OF THE DRAWINGS

Further features and advantages of the present disclosure will become apparent from the following detailed description, taken in combination with the appended drawings, in which.

DETAILED DESCRIPTION

Referring now to the drawings and more particularly to FIGS. 2 to 7, there is shown a fiber optic cable extension sleeve 20, or sleeve 20, in accordance with an embodiment. Sleeve 20 is for receiving/protecting one or more splice protector(s) 28 of fused fiber strands 29. The fiber optic cable extension sleeve 20 comprises a substantially flexible main body 30 which defines an inner surface 31, an outer surface 33, and opposite longitudinal edges 32, 34 for releasably engaging one another, which provides the inner surface 31 to form a passage 38 for receiving the fused fiber strands 29. Sleeve 20 further comprises a splice protector receiving member 35 which extends from the inner surface 31 of the main body 30 between the opposite longitudinal edges 32, 34 for releasably securing the one or more splice protector(s) 28 therein.

Figure 4A:
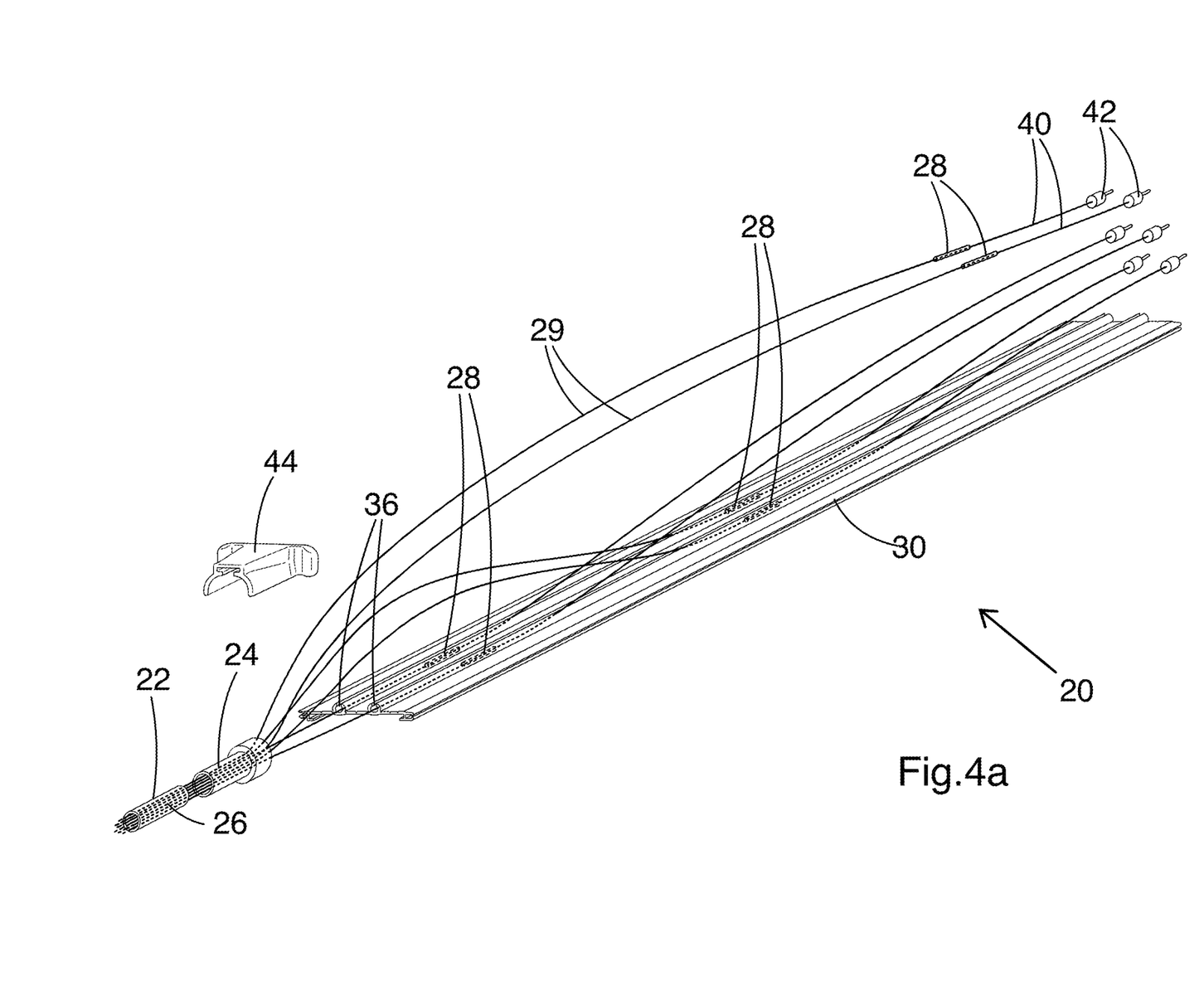
FIG. 4a is a schematic top perspective view of the fiber optic cable extension sleeve of FIG. 2, where the sleeve, in its opened configuration, releasably receives splice protectors of fused fiber strands.
Figure 4B:
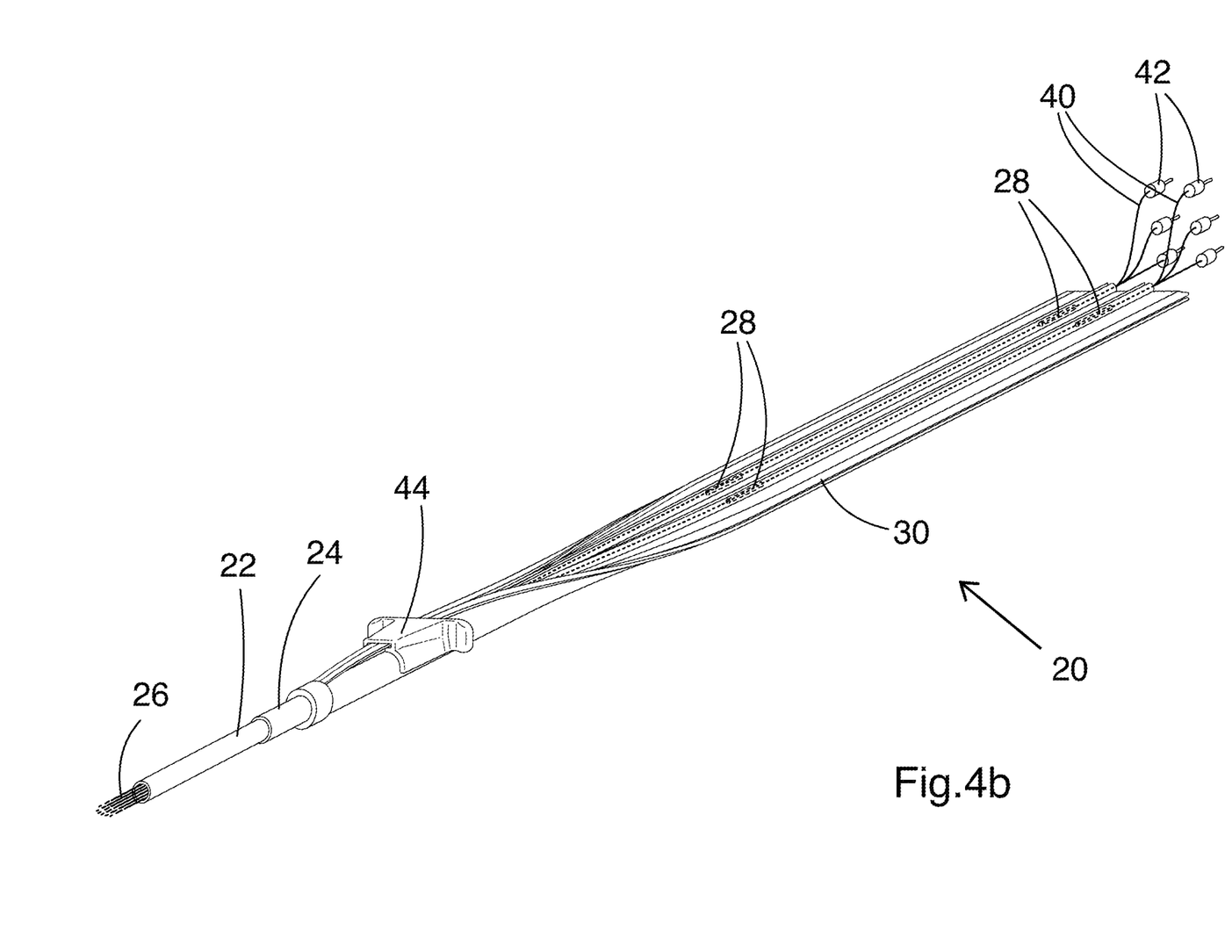
FIG. 4b is a schematic top perspective view of the fiber optic cable extension sleeve shown in FIGS. 2 and 3, where part of the sleeve is in its releasably closed configuration.
Figure 5:
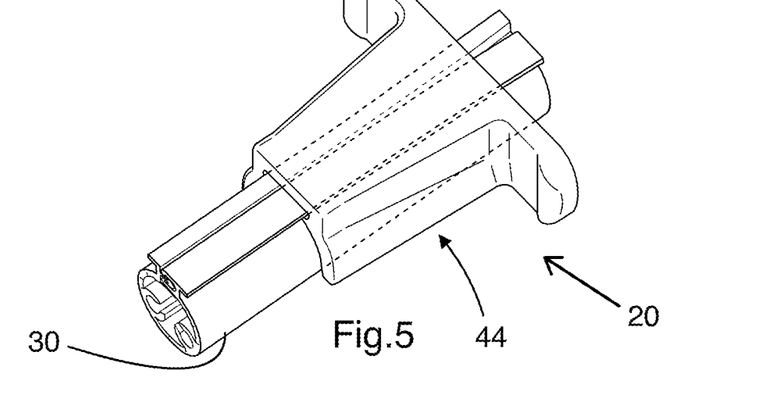
FIGS. 5 & 6 are different top perspective views of the fiber optic cable extension sleeve, showing the closing member around the substantially flexible main body.
Figure 6:
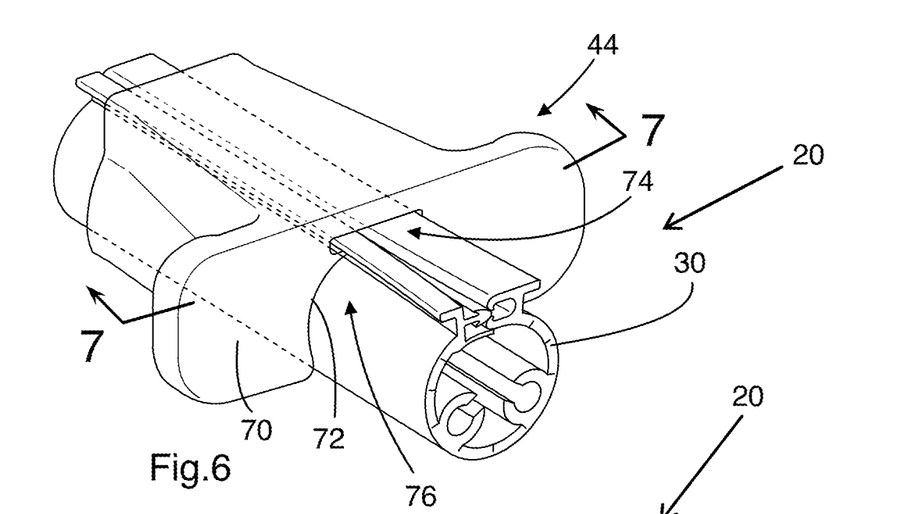

Sleeve 20 is typically a re-openable jacket sleeve that may be attached to the end 22 of a fiber optic cable, via, for example, a cable gland 24, a heat shrink, simple tie-wrap or the like, which forms a continuation, or extension, of the fiber optic cable jacket 26, as best shown in FIGS. 4a and 4b.

Figures 2, 3:
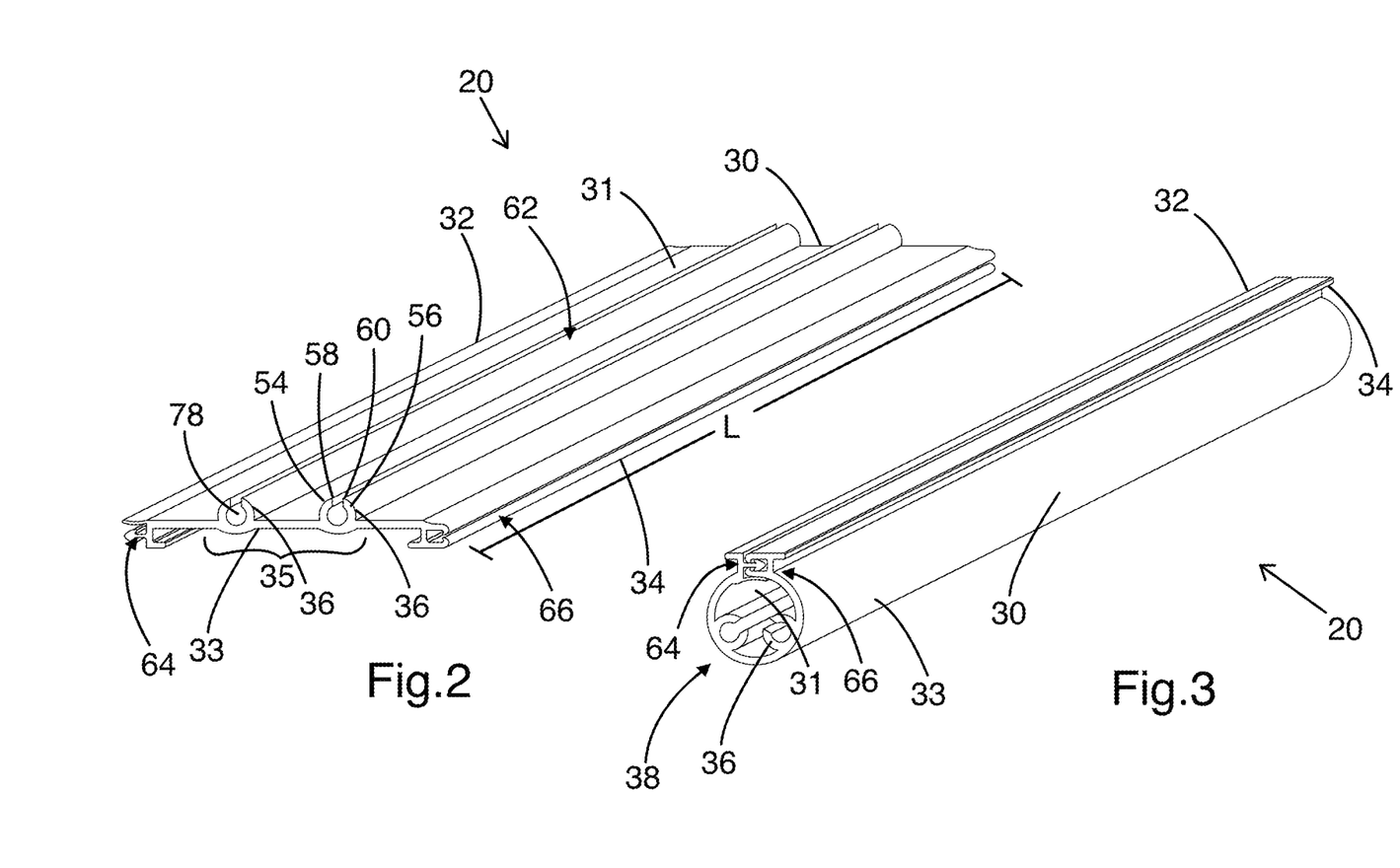
FIG. 2 is a schematic top perspective view of a fiber optic cable extension sleeve in accordance with an embodiment, shown in an opened configuration.
FIG. 3 is a schematic top perspective view of the fiber optic cable extension sleeve of FIG. 2, shown in a releasably closed configuration.

As shown in FIG. 2, the splice protector receiving member 35 extends from the inner surface 31 longitudinally along the length L of the flexible main body 30. As shown, the splice protector receiving member 35 comprises two distant longitudinal receiving channels 36 which are adapted for releasably securing one or more splice protectors 28 therein. Each one of the longitudinal receiving channels 36 defines a first lip 54 and a second lip 56, distant from the first lip 54. The first and second lips 54, 56 outwardly extend from the inner surface 31. First lip 54 defines a first lip end 58 while second lip 56 defines a second lip end 60, which is distant from first lip end 58. Such configuration provides a longitudinal passage 62 for securing the splice protectors 28 within longitudinal receiving channels 36.

Referring now to FIG. 3, there is shown that longitudinal edge 32 defines an attachment member 64 while the opposite one, longitudinal edge 34, defines a corresponding attachment member 66 for releasably engaging with attachment member 64. As shown, attachment member 64 defines a male attachment element while corresponding attachment member 66 defines a female attachment element for releasably receiving the male attachment element.

It is to be mentioned that substantially flexible main body 30, splice protector receiving member 35 (the two longitudinal receiving channels 36) and attachment members 64, 66 (of any other shapes/configurations) may be integrally formed, such as to provide required flexibility to sleeve 20, so that opposite longitudinal edges 32, 34 can releasably engage one another, but also, so that one or more splice protector(s) 28 can releasably be secured into longitudinal receiving channels 36. However, alternatively, the person skilled in the art would understand that flexible main body 30, splice protector receiving member 35 (the two longitudinal receiving channels 36) and attachment members 64, 66 may be provided in two or more parts (of same or different material), as long as longitudinal edges of each part releasably engage one another.

It is however to be mentioned that more than only one, or more than two longitudinal receiving channel(s) 36, or integrated protective slots, may extend from inner surface 31 of main body 30, as long as each channel 36 is designed to securely hold in place splice protectors 28 of the fused fiber strands 29. Since channels 36 are continuous along the length L of main body 30, a multitude of slice protectors 28 can be securely placed along these channels 36, or slots, as best illustrated in FIGS. 4a and 4b.

In installation, fiber optic cable extension sleeve 20 is attached to fiber optic cable jacket 26 of end 22 of fiber optic cable via cable gland 24, or the like, depending on the application. In the opened configuration, shown in FIG. 2, flexible main body 30 is laid out flat in the working area, before performing the splices and the fiber strands 29 are measured and cut accordingly to allow each splice protector 28 to fit properly in a channel 36, or protective slot. Similarly, the pigtails 40 are measured and cut accordingly for insuring that the connectors 42, at the end of pigtails 40, will fit properly in the panel (not shown). After completion, main body 30 is provided in its releasably closed configuration, as opposite longitudinal edges 32, 34 are releasably engaged one to another (which provides the inner surface 31 to form a passage 38 for receiving the fused fiber strands 29), as shown in FIG. 3, and installed in the panel, since the re-openable jacket sleeve (fiber optic cable extension sleeve 20) is now an extension of end 22 of fiber optic cable.

Therefore, in the event of repair, panel replacement or pigtail re-termination, the sleeve 20 can be re-opened and specific fiber optic strands 29 can be easily accessed and/or reworked. This is not always possible when using known fiber optic splice closures, where all fiber optic splices are packed in a small closed enclosure. It can thus be difficult to access a specific fiber splice protector for rework.

Sleeve 20 can also be very useful in the event where cable end 22 is too short to fit properly in the panel. Now being part of fiber optic cable, sleeve 20 may act as an extension of cable for at least 1 meter (about 3 feet) or more, if required. Therefore, it is possible to avoid expensive replacement of the whole fiber optic cable. Sleeve 20 can also be very useful when, for some reason, fiber splicing is required, and the panel in place is not designed to support existing fiber optic splice closures.

Referring now to FIGS. 4a, 4b, 5, 6 and 7, there is shown a closing member 44 for interfacing with the substantially flexible main body 30. Such closing member 44 may provide a secured closure of the substantially flexible main body 30 when longitudinal edges 32, 34 releasably engage one another.

Figure 7:
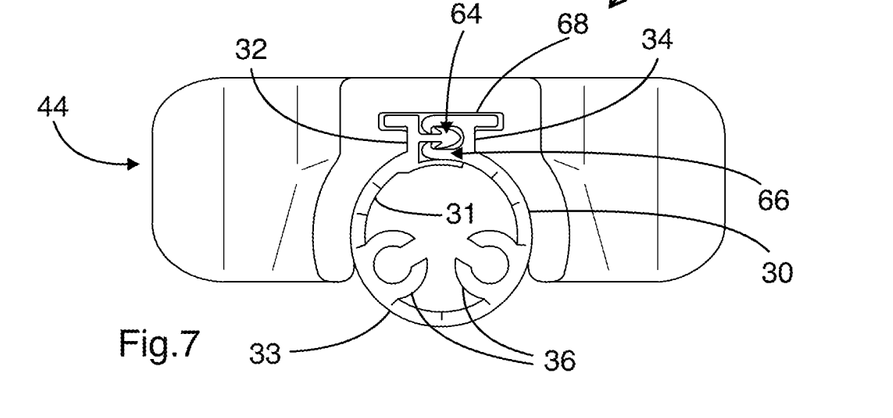
FIG. 7 is an enlarged section view taken along line 7-7 of FIG. 6.

As best shown in FIG. 7, attachment members 64, 66, when releasably engaged together, define an attachment external surface 68. Closing member 44 includes a closing member main body 70, which defines a closing member inner surface 72 for interfacing with the attachment external surface 68 of the substantially flexible main body 30. The closing member inner surface 72 therefore defines a first passage 74 for securely receiving the attachment members 64, 66 when releasably engaged together, and a second passage 76 for securely receiving part of the substantially flexible main body 30.

Sleeve 20 may therefore be closable by means of closing member 44, such as a zipper or other means (FIGS. 5-7) for releasably connecting longitudinal edge 32 to edge 34 provided with attachment members 64, 66, such as using a tongue and groove attachment mechanism or the like, as shown in FIGS. 2-7.

It is to be mentioned that inner surface 31 of the substantially flexible main body 30 may further include one or more longitudinal channeled recess(es) 48 along length L of the flexible main body 30 between opposite longitudinal edges 32, 34, as best shown in FIGS. 8-11, where main body 30 includes a plurality of recesses 48. Such longitudinal recesses 48 may ease the folding of main body 30 into its releasably closed configuration.

Although not illustrated, each protective slot 36 could be discontinued over its length, such as to provide a plurality of short slots positioned in line with one another. Alternatively, the short slots may not be in line with one another, and therefore be spread over inner surface 31 of flexible main body 30 while remaining substantially parallel to longitudinal edges 32, 34.

Figure 8:
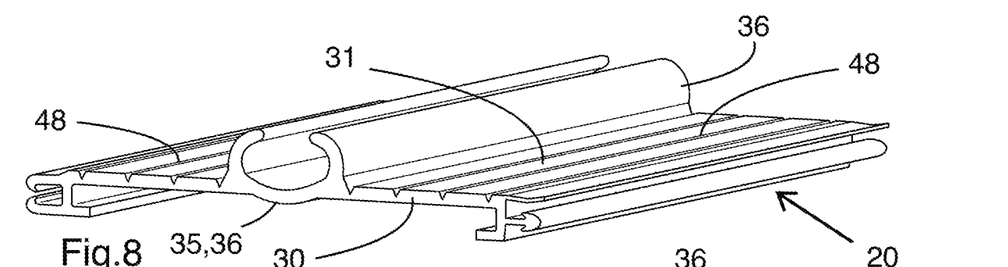
FIG. 8 is a schematic top perspective view of a fiber optic cable extension sleeve according to another embodiment, showing one large size splice protector receiving member/longitudinal receiving channel.
Figures 9, 10:
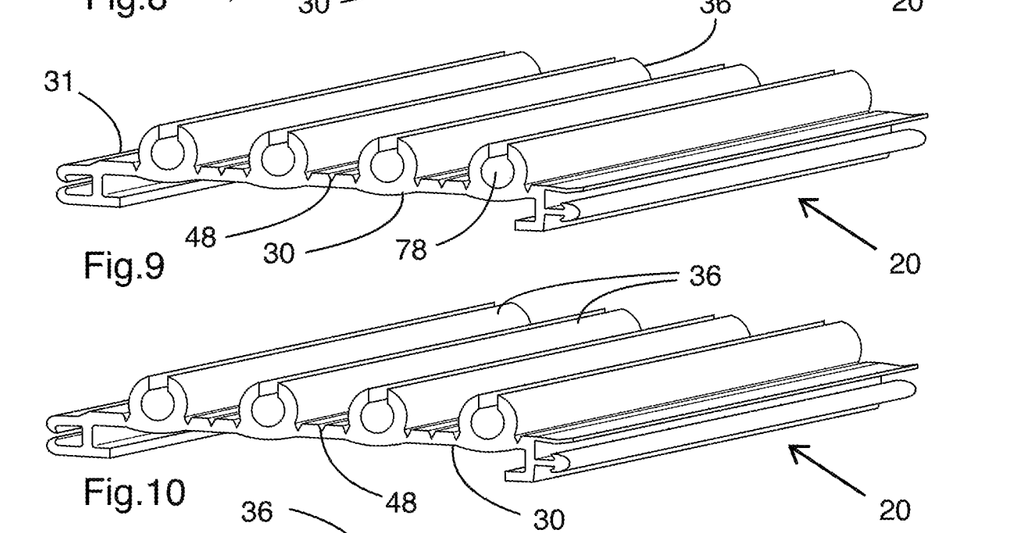
FIG. 9 is a schematic top perspective view of a fiber optic cable extension sleeve according to another embodiment, showing four medium size longitudinal receiving channels.
FIG. 10 is a schematic top perspective view of a fiber optic cable extension sleeve according to another embodiment, showing four small size longitudinal receiving channels.
Figure 11:
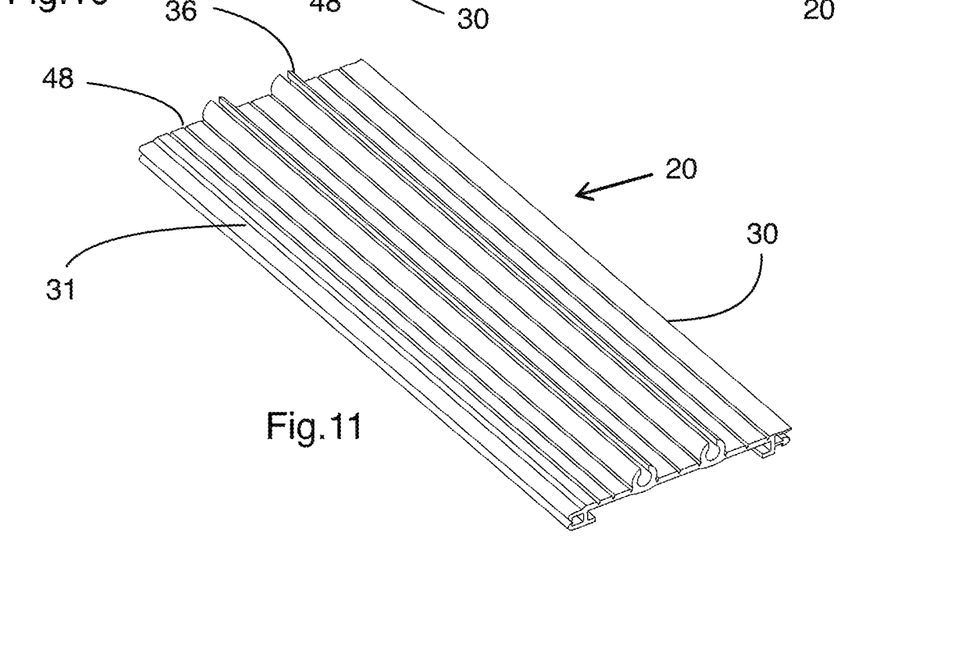
FIG. 11 is a schematic top perspective view of a fiber optic cable extension sleeve according to another embodiment, showing two medium size longitudinal receiving channels.

It is also to be mentioned that each one of the plurality of distant longitudinal receiving channels 36 defines a channel section 78 which corresponds to a splice protector section (not shown) such as to provide a secured fitting of the splice protectors 28 within the channels 36. Indeed, FIGS. 8 to 11 show different embodiments of sleeve 20 including more or less channels 36 (one channel 36 in FIG. 8 and four channels 36 in FIGS. 9-11) and/or different sizes of protective slots or channels 36, namely one large size (FIG. 8), four medium size (FIG. 9), four small size (FIG. 10), and two medium size (FIG. 11) channels 36, respectively. Although channel section 78 of a channel 76 is preferably circular (FIGS. 2, 3, 4a, 4b, 5, 6, 7, 9, 10 and 11), each channel could have any section shape, to accommodate different type of splice protectors, and as required to support different sizes and shapes of splice protectors 28, such as an oval shape, as shown in FIG. 8.

Thus, fiber optic cable extension sleeve 20 is a re-openable jacket sleeve or casing allowing for repair, panel replacement or pigtail re-termination (with specific fiber optic strands that can be easily accessed and/or reworked), and which typically forms a continuation, or extension, of the fiber optic cable jacket 26. Sleeve 20 has a preferably flexible main body 30 (while it can be provided otherwise) and which may be closable by means of a zipper or the like.

Fiber optic cable extension sleeve 20 further includes at least one, but preferably two (or more), integrated slots/channels 36 designed to hold in place the splice protectors 28 of fused fiber strands 29. Since these channels 36 are continuous along the length L of inner surface 31 of main body 30, a multitude of slice protectors 28 can be securely placed along these channels 36.

Fiber optic cable extension sleeve 20 may further be attached to the jacket 26 of the fiber optic cable end 22 via a cable gland 24, a heat shrink, using a tie-wrap or the like, depending on the application.

Fiber optic cable extension sleeve 20, when in its releasably closed configuration, can be installed in a panel, since it is now part of cable end 22.

Fiber optic cable extension sleeve 20 can also be very useful in the event where cable end 22 is too short to fit properly in the panel. As being essentially part of the fiber optic cable, sleeve 20 may act as an extension of cable for at least 1 meter (3 feet) or more if required, and therefore can avoid expensive replacement of the whole fiber optic cable.

Fiber optic cable extension sleeve 20 may easily be manufacturable in different shapes and sizes, such as to receive a large number of optical strand splices, or splice protectors 28, therein.

While preferred embodiments have been described above and illustrated in the accompanying drawings, it will be evident to those skilled in the art that modifications may be made therein without departing from the essence of this disclosure. Such modifications are considered as possible variants comprised in the scope of the disclosure.

The invention claimed is:

1. A fiber optic cable extension sleeve for receiving a splice protector of fused fiber strands, said fiber optic cable extension sleeve comprising:
    a substantially flexible main body defining an inner surface and opposite longitudinal edges for releasably engaging one another, thereby providing the inner surface to form a passage for receiving the fused fiber strands; and
    a splice protector receiving member extending from the inner surface of the main body between the opposite longitudinal edges for releasably securing the splice protector therein.

2. The fiber optic cable extension sleeve of claim 1, wherein the splice protector receiving member is extending from the inner surface longitudinally along the length of the flexible main body.

3. The fiber optic cable extension sleeve of claim 2, wherein the splice protector receiving member comprises a plurality of distant longitudinal receiving channels for releasably securing a plurality of splice protectors therein.

4. The fiber optic cable extension sleeve of claim 3, wherein each one of the plurality of longitudinal receiving channels comprises a first lip and a second lip distant from the first lip, the first lip and the second lip outwardly extending from the inner surface.

5. The fiber optic cable extension sleeve of claim 4, wherein the first lip comprises a first lip end and the second lip comprises a second lip end distant from the first lip end, thereby providing a longitudinal passage for securing the splice protector within the longitudinal receiving channel.

6. The fiber optic cable extension sleeve of claim 1, wherein one of the opposite longitudinal edges comprises an attachment member and the other one of the opposite longitudinal edges comprises a corresponding attachment member for releasably engaging with the attachment member.

7. The fiber optic cable extension sleeve of claim 6, wherein the attachment member comprises a male attachment element and the corresponding attachment member comprises a female attachment element for releasably receiving the male attachment element.

8. The fiber optic cable extension sleeve of claim 6, wherein the substantially flexible main body, the splice protector receiving member and the attachment members are integrally formed.

9. The fiber optic cable extension sleeve of claim 6, further comprising a closing member for interfacing with the substantially flexible main body, thereby providing a secured closure of the substantially flexible main body when the longitudinal edges releasably engage one another.

10. The fiber optic cable extension sleeve of claim 9, wherein the attachment members, when releasably engaged together, define an attachment external surface, and further wherein the closing member comprises:
    a closing member main body defining a closing member inner surface for interfacing with the attachment external surface of the substantially flexible main body.

11. The fiber optic cable extension sleeve of claim 10, wherein the closing member inner surface defines a first passage for securely receiving the attachment members when releasably engaged together, and a second passage for securely receiving part of the substantially flexible main body.

12. The fiber optic cable extension sleeve of claim 1, wherein the inner surface of the substantially flexible main body comprises a longitudinal channeled recess along the length of the flexible main body between the opposite longitudinal edges.

13. The fiber optic cable extension sleeve of claim 1, wherein the inner surface of the substantially flexible main body comprises a plurality of spaced apart longitudinal channeled recesses along the length of the flexible main body between the opposite longitudinal edges.

14. The fiber optic cable extension sleeve of claim 2, wherein the splice protector receiving member is extending from the inner surface and longitudinally and continuously along the length of the flexible main body.

15. The fiber optic cable extension sleeve of claim 3, wherein each one of the plurality of distant longitudinal receiving channels defines a channel section corresponding to a splice protector section.

16. The fiber optic cable extension sleeve of claim 15, wherein the channel section defines a circular section or an oval.

17. A fiber optic cable extension sleeve for receiving a plurality of splice protectors of fused fiber strands, said fiber optic cable extension sleeve comprising:
    a substantially flexible main body defining an inner surface and opposite longitudinal edges for releasably engaging one another, thereby providing the inner surface to form a passage for receiving the fused fiber strands;
    a plurality of distant longitudinal receiving channels extending from the inner surface longitudinally along the length of the flexible main body for releasably securing the plurality of splice protectors therein; and
    a closing member for interfacing with the substantially flexible main body, thereby providing a secured closure of the substantially flexible main body when the longitudinal edges releasably engage one another.

18. The fiber optic cable extension sleeve of claim 17, wherein each one of the plurality of longitudinal receiving channels comprises a first lip and a second lip distant from the first lip, the first lip and the second lip outwardly extending from the inner surface.

19. The fiber optic cable extension sleeve of claim 18, wherein the first lip comprises a first lip end and the second lip comprises a second lip end distant from the first lip end, thereby providing a longitudinal passage for securing the splice protector within the longitudinal receiving channel.

20. The fiber optic cable extension sleeve of claim 17, wherein the attachment members, when releasably engaged together, define an attachment external surface, and further wherein the closing member comprises:

a closing member main body defining a closing member inner surface for interfacing with the attachment external surface of the substantially flexible main body.

\* \* \* \* \*